United States Patent [19]

Fowler

[11] 4,146,901

[45] Mar. 27, 1979

[54] APPARATUS FOR RECORDING INFORMATION ON A RECORDING SURFACE

[75] Inventor: Raymond L. Fowler, Boulder, Colo.

[73] Assignee: International Business Machines Corporation, Armonk, N.Y.

[21] Appl. No.: 854,857

[22] Filed: Nov. 25, 1977

[51] Int. Cl.[2] .................. G01D 15/18

[52] U.S. Cl. .................. 346/140 R; 346/75

[58] Field of Search .................. 346/75, 140 R

[56] References Cited

U.S. PATENT DOCUMENTS

| | | | |
|---|---|---|---|
| 3,588,906 | 6/1971 | Van Brimer et al. | 346/75 X |
| 3,787,882 | 1/1974 | Fillmore et al. | 346/140 R X |
| 3,820,121 | 6/1974 | Rich et al. | 346/140 R |
| 3,898,671 | 8/1975 | Berry et al. | 346/75 |
| 3,987,492 | 10/1976 | Kraus et al. | 346/75 |
| 4,045,770 | 8/1977 | Arnold et al. | 346/75 |
| 4,063,254 | 12/1977 | Fox et al. | 346/75 |

*Primary Examiner*—George H. Miller, Jr.
*Attorney, Agent, or Firm*—Frank C. Leach, Jr.

[57] ABSTRACT

The start of each cycle of a pump, which supplies a pressurized ink stream through a nozzle for application to a recording surface on a rotary drum, is synchronized with each revolution of the drum. If more than one cycle of the pump occurs during each revolution of the drum, the number of the cycles in each drum revolution must be an integer with each cycle starting an equal angle of the revolution of the drum from the start of the prior cycle.

7 Claims, 5 Drawing Figures

APPARATUS FOR RECORDING INFORMATION ON A RECORDING SURFACE

In an ink jet printing system in which a pump supplies a pressurized ink stream through a nozzle for application to a recording surface such as paper, for example, the pump has pressure fluctuations, which create velocity perturbations in the ink stream. Thus, during each cycle of the pump, these pressure fluctuations cause a variation in the velocity of the ink stream.

With the recording surface mounted on a rotary drum, for example, the location of an ink droplet on the recording surface is dependent upon both the speed of the drum and the velocity (flight time from the nozzle to the recording surface) of the droplet. If the velocity of the droplet is faster than its predetermined velocity, the drum will not have rotated sufficiently to have the recording surface at the desired position whereby the droplet will not strike the recording surface at the desired position but strike it earlier because of the shorter flight time of the droplet.

If the velocity of the droplet is slower than its predetermined velocity, the drum will have rotated a greater angle than desired prior to the droplet striking the recording surface. This is because of the longer flight time of the droplet to reach the recording surface due to the lower velocity.

Accordingly, if the velocity of the droplet is not as its predetermined velocity, the desired print pattern will not appear on the recording surface. For example, two droplets will not strike the recording surface in a straight line beneath each other one revolution of the drum apart if the velocity of the droplet is not the same during each revolution. As a result, a curved line will be produced where a straight line should occur.

The present invention overcomes the foregoing problem through providing an arrangement for synchronizing the start of each pump cycle with a predetermined position of the drum with the number of the pump cycles for each revolution being an integer. If the integer is one, then each of the pump cycles start at the same angular position of the drum. If the integer is two, for example, then a pump cycle starts after each 180° of revolution of the drum.

Any variation in the velocity of the stream produced by fluctuation of the pump pressure during a particular cycle always occurs at the same time. Therefore, two droplets on two successive revolutions of the drum will be aligned with each other to produce a straight line even though they may be slightly displaced with respect to the preceding droplet in each pump cycle due to the variation in pump pressure.

Thus, by initiating each cycle of the pump at a specific angular position of the drum, any placement errors of the droplets on the recording surface will be the same for each revolution. Therefore, a straight line will be straight but will be slightly displaced from its theoretically desired position.

For example, if the velocity of the stream is always fast at the beginning of a print sweep at the lefthand side of the recording surface and then returns to nominal velocity, all of the droplets will strike the page with the same error but the difference will not be observed. The lefthand side of the print pattern will be slightly expanded because of this.

An object of this invention is to synchronize the start of each cycle of a pump which supplies a pressurized ink stream through a nozzle to a recording surface with a predetermined position of the recording surface along a predetermined path.

Another object of this invention is to synchronize the start of each cycle of a pump which supplies a pressurized ink stream through a nozzle to a recording surface, which is mounted on a rotary drum, to a predetermined angular position of the rotary drum.

The foregoing and other objects, features, and advantages of the invention will be apparent from the following more particular description of a preferred embodiment of the invention as illustrated in the accompanying drawings.

Figure 1:
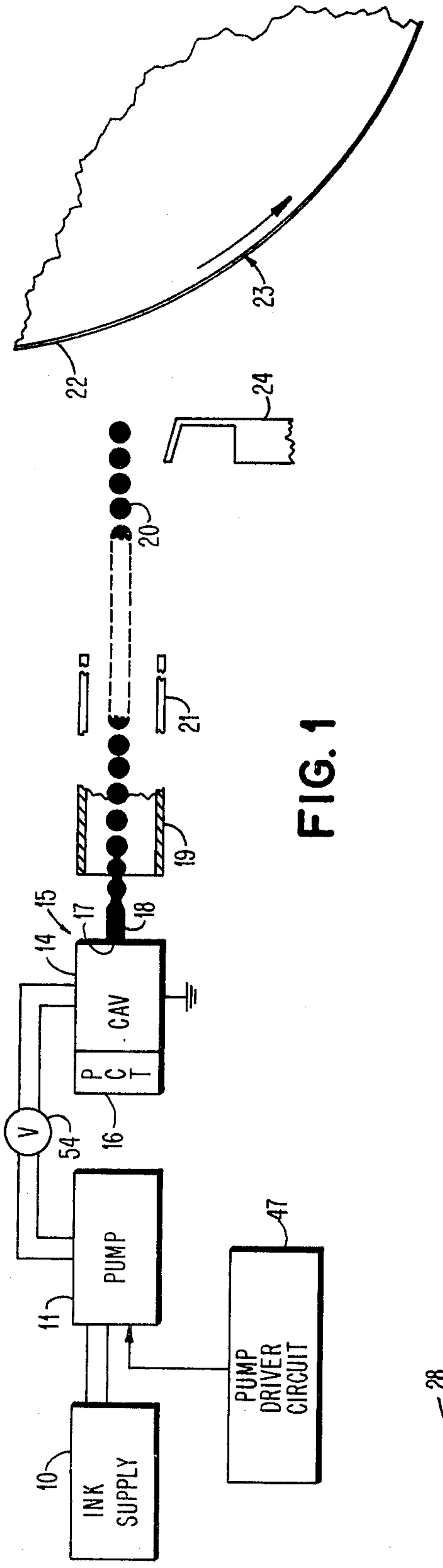
FIG. 1 is a schematic diagram of an ink jet printing apparatus having the present invention.

Referring to the drawings and particularly FIG. 1, there is shown a reservoir 10 of ink supplied to a pump 11. As more particularly shown and described in the copending patent application of Kermit A. Meece et al. for "Method And Apparatus For Determining The Velocity Of A Liquid Stream of Droplets," Ser. No. 843,081, filed Oct. 17, 1977, and assigned to the same assignee as the assignee of this application, ink is supplied under pressure from the pump 11 to an ink cavity 14 in an ink jet head 15. The ink jet head 15, which is mounted on a carrier on which the pump 11 also is mounted, includes a piezoelectric crystal transducer 16, which applies a predetermined frequency to the pressurized ink within the ink cavity 14.

The pressure of the ink supplied from the pump 11 determines the velocity at which the ink stream flows from the ink jet head 15 through a nozzle 17 (one shown). It should be understood that the ink jet head 15 may have a plurality of the nozzles 17.

An ink jet stream 18 flows from the nozzle 17 through a charge electrode 19. The stream 18 breaks up into droplets 20 at a predetermined break-off point, which is within the charge electrode 19. Thus, each of the droplets 20 can be charged to a desired magnitude or have no charge.

The droplets 20 move along a predetermined path from the charge electrode 19 to pass through a pair of deflection plates 21. If there is no charge on one of the droplets 20, the path of the non-charged droplet 20 is not altered as it passes through the deflection plates 21 so that the non-charged droplet 20 strikes a recording surface 22 such as paper, for example, on a rotary drum 23. If the droplet 20 has been charged to a sufficient magnitude, the deflection plates 21 deflect the charged droplet 20 so that it will not strike the recording surface 22 but be deposited in a gutter 24. It should be understood that the charged droplets 20 could be deflected to strike the recording surface 22 and the gutter 24 be disposed so that the non-charged droplets 20 are deposited therein, if desired.

Figure 2:
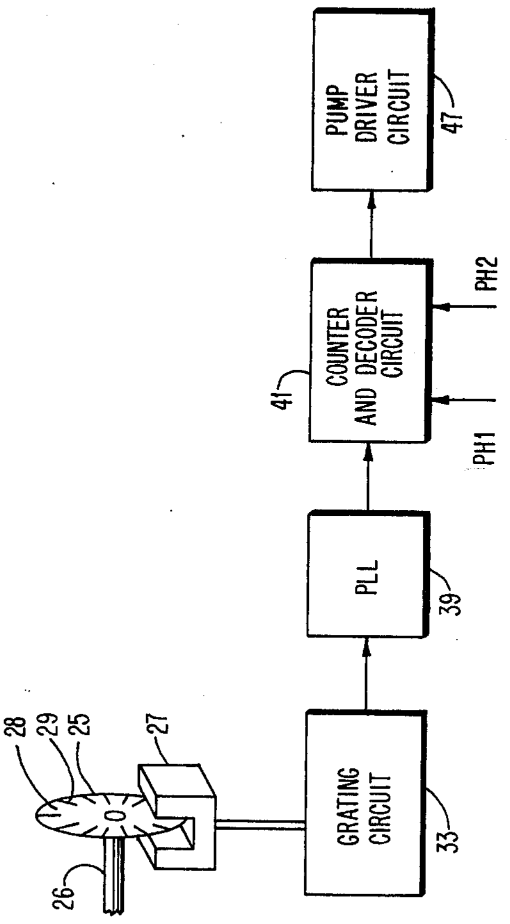
FIG. 2 is a schematic block diagram showing control of the start of a pump cycle in accordance with a position of the drum supporting the recording surface.

A grating disk 25 (see FIG. 2) is mounted on a shaft 26 of the rotary drum 23 for rotation therewith. The disk 25 rotates through a light source-sensor module 27. The disk 25 has a track 28 of apertures 29 with equal spacing therebetween. There are 216 of the apertures 29 in the track 28 with each of the apertures 29 being equally angularly spaced about the circumference of the disk 25.

Figure 3:
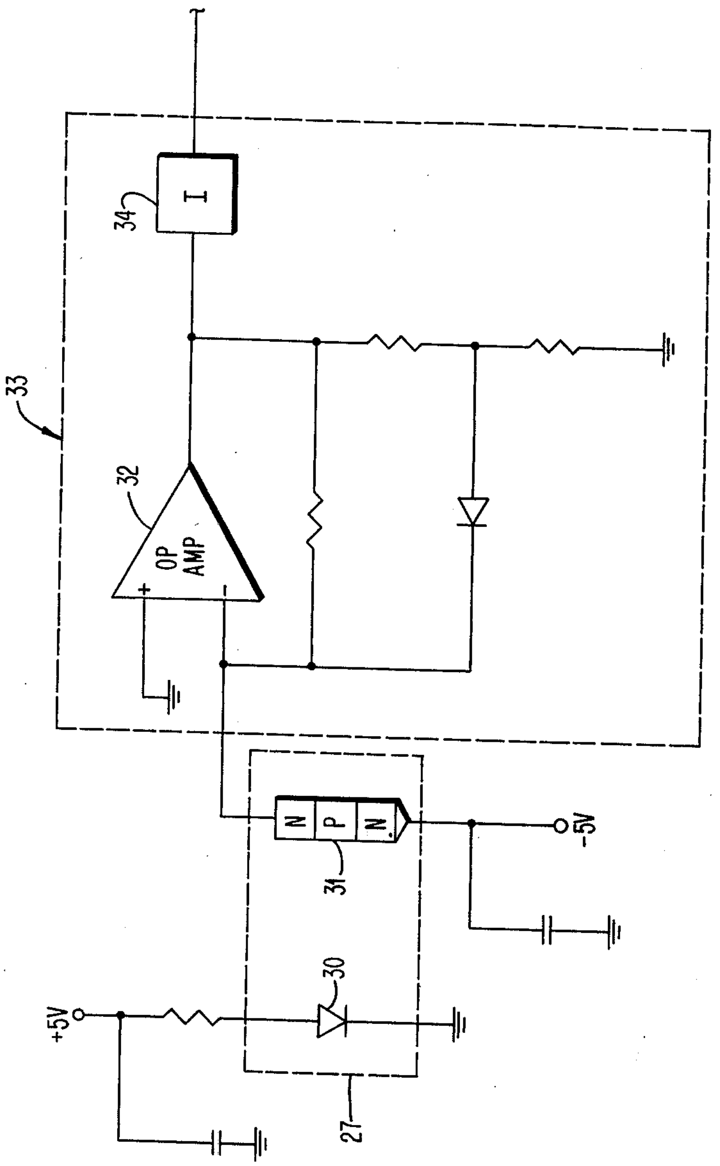
FIG. 3 is a schematic block diagram of a circuit for producing signals in accordance with the rotation of the rotary drum supporting the recording surface.

As the rotary drum 23 rotates, the track 28 on the disk 25 intermittently interrupts light from a light emitting diode 30 (see FIG. 3) of the light source-sensor module 27 to a phototransistor 31 of the light source-sensor module 27. When the light from the LED 30 passes through one of the apertures 29 to impinge on the phototransistor 31, a very high current flows through the phototransistor 31. This causes an operational amplifier 32, which has its inverting input connected to the collector of the phototransistor 31, of a grating circuit 33 to have a high at its output. One suitable example of the operational amplifier 32 is an operational amplifier sold by Fairchild as model 747.

The grating circuit 33 includes a Schmitt trigger inverter 34, which has its input connected to the output of the operational amplifier 32 and inverts the output of the amplifier 32. One suitable example of the inverter 34 is a Schmitt trigger inverter sold as model SN7414 by Texas Instruments.

The output of the inverter 34 is the opposite of the output of the operational amplifier 32. Thus, the output of the inverter 34 is low when one of the apertures 29 of the track 28 is disposed to allow light to be transmitted from the LED 30 to the phototransistor 31.

When the light from the LED 30 to the phototransistor 31 is blocked by a non-apertured position of the track 28 between two of the apertures 29, then the output of the inverter 34 is high. This is because the output of the operational amplifier 32 is low due to the phototransistor 31 having very little current flow therethrough.

By equally spacing the apertures 29 around the disk 25 with the non-apertured portions between the apertures 29 having the same width as the width of each of the apertures 29, a square wave is produced at the output of the inverter 34. The square wave has a frequency of two hundred and sixteen cycles per revolution of the rotary drum 23.

The square wave output of the inverter 34 is supplied to a phased locked loop (PLL) 39. One suitable example of the PLL is a phased locked loop sold by Motorola as model SE/NE 565.

The PLL 39 increases the frequency of the output of the inverter 34 eight times. Thus, with the track 28 of the grating disk 25 having 216 of the apertures 29, the frequency from the output of the PLL 39 is 1,728 cycles per revolution of the rotary drum 23. Since the rotary drum 23 has 1,728 printing elements around the circumference of the drum 23, each cycle from the output of the PLL 39 represents one of the printing elements.

Figure 4:
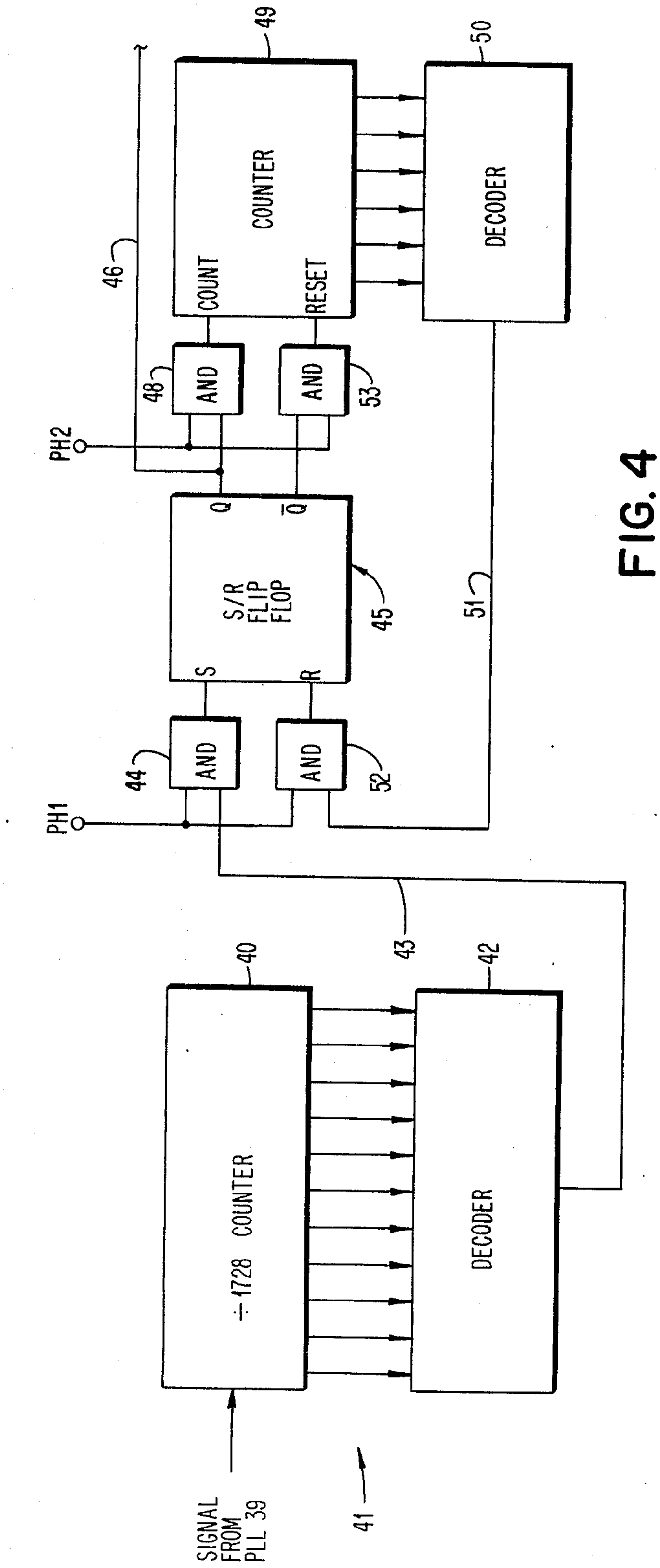
FIG. 4 is a schematic block diagram of the counter and decoder circuit of FIG. 2.

The output of the PLL 39 is supplied to a counter 40 (see FIG. 4) of a counter and decoder circuit 41. The counter 40 divides the frequency by 1,728. That is, the counter 40 counts one for each of the 1,728 cycles occurring during each revolution of the rotary drum 23.

The output of the counter 40 is connected to a decoder 42 of the counter and decoder circuit 41. The decoder 42 produces a pulse on its output line 43 once for every 1,728 counts by the counter 40. The decoder 42 produces the high signal on the output line when the counter 40 reaches a count of 1,727.

It should be understood that the counter 40 is set to the count of zero at the start up of the ink jet printing apparatus and this corresponds to some position of the rotary drum 23. The counter 40 is reset to zero after it has counted to 1,727 so that the count of 1,727 is always the same position of the rotary drum 23 during each revolution thereof.

The decoder 42 supplies the high on its output line 43 to an AND gate 44. The output of the AND gate 44 goes high when a PH1 signal, which is the other input to the AND gate 44, goes high after the output line 43 of the decoder 42 has a high thereon. The PH1 signal is a clock signal supplied from an oscillator (not shown) and has a duty cycle less than half the width of the high signal on the output line 43 of the decoder 42.

When the PH1 signal goes up after the signal on the output line 43 of the decoder 42 has gone up, the AND gate 44 has its high supplied to an S input of an S/R flip-flop 45. The high at the S input of the flip-flop 45 causes its Q output to go up. This high at the Q output of the flip-flop 45 is supplied by a line 46 to a pump driver circuit 47 (see FIGS. 1 and 2) for the pump 11 (see FIG. 1). The pump driver circuit 47 is more particularly shown and described in the aforesaid Meece et al. application.

Figure 5:
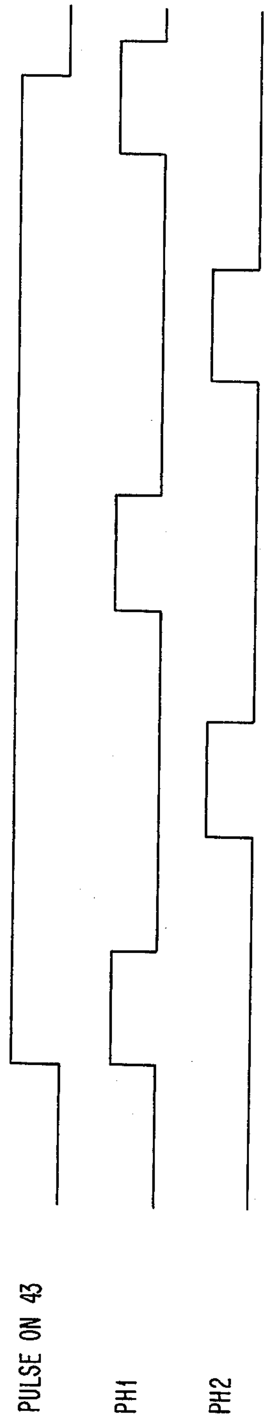
FIG. 5 is a timing diagram showing the relationship of various signals used with the counter and decoder circuit of FIG. 4.

The Q output of the flip-flop 45 also is supplied as one input to an AND gate 48. The other input to the AND gate 48 is a PH2 signal, which is a clock signal from an oscillator (not shown), having the same frequency as the PH1 signal so that the duty cycle of the PH2 signal is less than half of the width of the high signal on the output line 43. As shown in FIG. 5, each of the up PH1 and PH2 signals is the same pulse width with both of the PH1 and PH2 signals being down for the same time between when one of the PH1 and PH2 signals goes down and the other goes up and this being the same period of time as when either of the PH1 or PH2 signals is up.

A counter 49 has its COUNT input connected to the output of the AND gate 48. The counter 49 counts one each time that the PH2 signal goes up after the Q output of the flip-flop 45 has gone high.

The counter 49 is connected to a decoder 50, which has its output line 51 connected as one of two inputs to an AND gate 52. The AND gate 52, which has its output connected to R input of the flip-flop 45, receives the PH1 signal as its other input.

The decoder 50 has a high on its output line 51 only after the counter 49 has counted a predetermined period of time. When the decoder 50 has a high on its output line 51, the AND gate 52 supplies a high to the R input of the flip-flop 45 the next time that the PH1 signal goes up.

Thus, a pedetermined number of the PH1 signals occurs between the time that the Q output of the flip-flop 45 goes up and the R input of the flip-flop 45 receives a high from the AND gate 52. Accordingly, the length of time that the high signal is supplied to the pump driver circuit 47 is determined by the counter 49. Therefore, the time that the signal from the Q output of the flip-flop 45 is up is independent of the velocity of the drum 23 whereby the high on the line 46 is constant even though the duty cycle of the signal on the line 46 varies with any variation in the velocity of the drum 23.

When the high at the R input of the flip-flop 45 occurs, the flip-flop 45 changes state so that its Q output goes low and its $\overline{Q}$ output goes high. The $\overline{Q}$ output of the flip-flop 45 is one of two inputs to an AND gate 53. The other input to the AND gate 53 is the PH2 signal.

The AND gate 53 has its output connected to RESET input of the counter 49. Accordingly, when the PH2 signal goes up after the R input of the flip-flop 45 has received the high from the AND gate 52, the counter 49 is returned to a count of zero. Thus, the counter 49 is ready to count again when the Q output of the flip-flop 45 next goes high.

Considering the operation of the present invention, the starting of a cycle occurs by opening a valve 54 (see FIG. 1) between the reservoir 10 and the pump 11. Then, the specific location of the print element on the rotary drum 23 at which the supply of ink starts is determined by the counter 40 (see FIG. 4) being set at zero.

When the counter 40 has counted to 1,727, the decoder 42 produces a high on its output line 43 and the counter 40 returns to zero. The high on the output line 43 of the decoder 42 causes the Q output of the flip-flop 45 to go high the next time that the PH1 signal goes up. This starts the high signal to the pump driver circuit 47 (see FIGS. 1 and 2) whereby the pump 11 (see FIG. 1) begins to supply ink through the nozzle 17 to the recording surface 22 on the rotary drum 23.

Beginning with the next PH2 signal occurring after the Q output of the flip-flop 45 (see FIG. 4) has gone high, the counter 49 counts one each time that the PH2 signal goes up . This continues until the pulse to the pump driver circuit 47 has been up for the desired period of time. When the counter 49 has counted for this desired period of time, the decoder 50 produces a high on its output line 51 whereby the Q output of the flip-flop 45 goes low the next time that the PH1 signal goes up. This results in the high signal to the pump driver circuit 47 going down.

After the Q output of the flip-flop 45 goes down because of the PH1 signal going up after the decoder 50 has a high on its output line 51, the counter 49 is reset to a count of zero the next time that the PH2 signal goes up. This is because the $\bar{Q}$ output of the flip-flop 45 is high.

Thus, each time that the drum 23 (see FIG. 1) has made a complete revolution, irrespective of the velocity of the drum 23, the counter 40 (see FIG. 4) will have counted the 1,728 cycles, which are equivalent to the 1,728 printing elements around the circumference of the drum 23 (see FIG. 1). As a result, the pump 11 will be energized from the pump driver circuit 47 for the same position of the drum 23 irrespective of the velocity of the drum 23.

By starting the application of the signal to the pump 11 at the same position of the rotary drum 23 during each revolution, any variation in pressure causes the same transposition of the droplets 20 on the same portion of the recording surface 22.

While the counter 40 (see FIG. 4) has been shown and described as being arbitrarily set to zero at the time of starting the pressurized ink stream, it should be understood that the counter 40 could be set at zero at a specific position of the drum 23 (see FIG. 1). This would require the disk 25 (see FIG. 2) to have a second track of apertures thereon with one less of the apertures in the second track than the apertures 29 of the track 28 but spaced the same amount as the apertures 29. This would require a second circuit, similar to that shown in FIG. 3, to produce a signal in accordance with the apertures of the second track on the disk 25 with the second circuit including a separate LED and phototransistor in the light source-sensor module 27.

The second track on the disk 25 would have the absent aperture correspond to the rotary position of the drum 23 (see FIG. 1) at which it is desired to start the pump 11. This absence of the aperture would be sensed and used with logic to set the counter 40 (see FIG. 4) to zero.

While the present invention has shown and described the recording surface 22 (see FIG. 1) as being movable relative to the nozzle 17, it should be understood that the recording surface 22 could be stationary and the nozzle 17 move thereabout. This would necessitate ascertaining when the nozzle 17 reaches the same position rather than when the rotary drum 23 reaches a specific position.

Additionally, the pump 11 could be energized more than once for each revolution of the drum 23. In such an arrangement, the decoder 42 (see FIG. 4) would produce a high on its output line 43 more than once for each revolution of the rotary drum 23 (see FIG. 1). However, the highs on the output line 43 (see FIG. 4) of the decoder 42 must occur at equal angular amounts of rotation of the rotary drum 23 (see FIG. 1) during each revolution.

While the present invention has shown and described the recording surface 22 as being mounted on the rotary drum 23, it should be understood that such is not a requisite for satisfactory operation of the present invention. It is only necessary that the pump 11 be started at some specific position in a predetermined path along which either the recording surface 23 or the nozzle 17 moves.

It should be understood that the predetermined frequency of the transducer 16 is coordinated with the speed of the drum 23 so that 1,728 of the droplets 20 are produced during each revolution of the drum 23. This insures that the number of the droplets 20 for each revolution of the drum 23 is independent of the speed of the drum 23.

An advantage of this invention is that repeatable variations in pump pressures do not cause any recognizable printing errors. Another advantage of this invention is that it renders repeatable pump pressure fluctuations harmless with respect to the quality of the print. A further advantage of this invention is that any variation in the velocity of the droplets does not affect the quality of the print. Still another advantage of this invention is that the average pressure of the pump will change, if the speed of the drum changes, due to the activation of the pump the same number of times per revolution of the drum.

While the invention has been particularly shown and described with reference to a preferred embodiment thereof, it will be understood by those skilled in the art that various changes in form and details may be made therein without departing from the spirit and scope of the invention.

What is claimed is:

1. An apparatus for recording information on a recording surface including:

a nozzle;

pump means to supply a pressurized ink stream through said nozzle;

means to cause break up of the stream into droplets spaced substantially uniform distances;

means to support the recording surface to have droplets of the stream strike the recording surface to record information on the recording surface, one of the recording surface and said nozzle being movable relative to the other in a predetermined path;

and means to cause each cycle of said pump means to start in accordance with at least one predetermined position of the movable one of the recording surface and said nozzle in its movement along the predetermined path.

2. The apparatus according to claim 1 in which said causing means causes each cycle of said pump means to start at only one predetermined position along the predetermined path.

3. The apparatus according to claim 1 in which:

said support means includes a rotatable drum, the recording surface being the movable one of the recording surface and said nozzle;

and said causing means includes means responsive to at least one predetermined position of said drum during each revolution of said drum to cause starting of a cycle of said pump means.

4. The apparatus according to claim 1 in which:

said support means includes a rotatable drum, the recording surface being the movable one of the recording surface and said nozzle;

and said causing means includes means responsive to only one predetermined position of said drum during each revolution of said drum to cause starting of a cycle of said pump means.

5. The appartus according to claim 1 in which said support means includes a drum.

6. The appartus according to claim 1 in which the recording surface is the movable one of the recording surface and said nozzle.

7. The apparatus according to claim 6 in which said causing means causes each cycle of said pump means to start at only one predetermined position along the predetermined path.

* * * * *